United States Patent
Bates et al.

(10) Patent No.: US 11,273,711 B2
(45) Date of Patent: Mar. 15, 2022

(54) POWER DISTRIBUTION SYSTEM AND METHOD

(71) Applicant: Redarc Technologies Pty Ltd., Morphett Vale (AU)

(72) Inventors: Timothy Bates, Adelaide (AU); Clinton Smith, Hallett Cove (AU); Zacharias Johannes Prinsloo, Hallett Cove (AU)

(73) Assignee: REDARC TECHNOLOGIES PTY LTD [AU/AU], Morphett Vale (SA)

( * ) Notice: Subject to any disclaimer, the term of this patent is extended or adjusted under 35 U.S.C. 154(b) by 80 days.

(21) Appl. No.: 16/961,178

(22) PCT Filed: Jan. 16, 2019

(86) PCT No.: PCT/AU2019/050027
§ 371 (c)(1),
(2) Date: Jul. 9, 2020

(87) PCT Pub. No.: WO2019/140483
PCT Pub. Date: Jul. 25, 2019

(65) Prior Publication Data
US 2021/0061105 A1  Mar. 4, 2021

(30) Foreign Application Priority Data
Jan. 17, 2018 (AU) .............................. 2018900140

(51) Int. Cl.
*B60L 1/00* (2006.01)
*B60Q 3/80* (2017.01)
*B60R 16/023* (2006.01)
*B60W 10/30* (2006.01)

(52) U.S. Cl.
CPC ................. *B60L 1/00* (2013.01); *B60Q 3/80* (2017.02); *B60R 16/0238* (2013.01); *B60W 10/30* (2013.01); *B60L 2250/16* (2013.01)

(58) Field of Classification Search
CPC combination set(s) only.
See application file for complete search history.

(56) References Cited

U.S. PATENT DOCUMENTS

| | | | |
|---|---|---|---|
| 9,327,600 B1* | 5/2016 | Nehmeh | B64D 41/00 |
| 9,937,817 B2* | 4/2018 | Niwa | B60L 1/00 |
| 10,604,090 B1* | 3/2020 | Blumenstein | B60R 16/0238 |
| 2003/0171854 A1* | 9/2003 | Pillar | G07C 5/008 |
| | | | 701/1 |
| 2004/0139238 A1 | 7/2004 | Luhrs et al. | |

(Continued)

FOREIGN PATENT DOCUMENTS

WO WO2013133818 9/2013

OTHER PUBLICATIONS

EP Extended Search Report in European Appln. No. 19741235.6, dated Sep. 14, 2021, 10 pages.

*Primary Examiner* — Adam D Houston
(74) *Attorney, Agent, or Firm* — Fish & Richardson P.C.

(57) ABSTRACT

The present invention relates to a power distribution system for and a method of controlling operation of loads of a vehicle or a towed vehicle, including configuring a controller, adapted to be mounted in a towed vehicle and adapted to be configured to control operation of loads in the towed vehicle, to output state commands to the loads to control the loads.

15 Claims, 6 Drawing Sheets

(56) References Cited

U.S. PATENT DOCUMENTS

| | | | |
|---|---|---|---|
| 2005/0114007 A1* | 5/2005 | Pillar | B60L 3/12 |
| | | | 701/82 |
| 2012/0207620 A1* | 8/2012 | Dalum | B60L 55/00 |
| | | | 417/44.1 |
| 2013/0127244 A1* | 5/2013 | Handa | B60W 20/13 |
| | | | 307/9.1 |
| 2013/0249280 A1* | 9/2013 | Goodermuth | B60L 50/10 |
| | | | 307/9.1 |
| 2014/0277869 A1* | 9/2014 | King | B60L 1/00 |
| | | | 701/22 |
| 2015/0102665 A1* | 4/2015 | Blackwood | B60R 16/005 |
| | | | 307/10.1 |
| 2016/0288744 A1* | 10/2016 | Rutherford | B60L 1/00 |
| 2017/0253127 A1* | 9/2017 | Ciaccio | B60L 53/00 |
| 2018/0102964 A1* | 4/2018 | Kao | H04L 67/12 |
| 2019/0180528 A1* | 6/2019 | Hall | G07C 5/008 |
| 2019/0337529 A1* | 11/2019 | Niedert | B60R 25/10 |
| 2020/0177008 A1* | 6/2020 | Tiedtke | B60R 16/033 |
| 2020/0233410 A1* | 7/2020 | Burns | B60L 50/60 |
| 2020/0307393 A1* | 10/2020 | Slepchenkov | B60L 1/00 |
| 2021/0025365 A1* | 1/2021 | Niu | F02N 11/0866 |
| 2021/0031639 A1* | 2/2021 | Kato | B60L 53/62 |
| 2021/0061105 A1* | 3/2021 | Bates | B60R 16/02 |
| 2021/0075735 A1* | 3/2021 | Tsuji | G06F 8/65 |
| 2021/0162867 A1* | 6/2021 | Clay | H02J 7/00034 |

* cited by examiner

POWER DISTRIBUTION SYSTEM AND METHOD

CROSS-REFERENCE TO RELATED APPLICATIONS

This application is a National Stage Application under 35 U.S.C. § 371 and claims the benefit of International Application No. PCT/AU2019/050027, filed Jan. 16, 2019, which is the country equivalent to Australia Application No. 2018900140, filed on Jan. 17, 2018. The disclosure of each of the foregoing applications is incorporated herein by reference in their entirety for all purposes.

TECHNICAL FIELD

The present invention relates to a power distribution system for and a method of controlling operation of loads of a vehicle or a towed vehicle. In particular, but not exclusively, the present invention includes a controller adapted to be mounted in a towed vehicle and adapted to be configured to control operation of loads in the towed vehicle.

BACKGROUND OF INVENTION

Modern vehicles generally have a power distribution system including one or more Electronic Control Units (ECUs) for controlling electrical systems, including vehicle accessories in the form of electrical loads, of a vehicle. Modern towed vehicles and recreational vehicles, such as camper trailers and caravans, also have many installed accessories, such as a fridge, in the form of electrical loads. These electrical loads are user controlled and are typically controlled with different input buttons and rotary knobs in the towed or towing vehicle. These different user input means, however, take up considerable space in a vehicle cabin or console area, can be confusing to use for the user, and generally require extensive wiring looms.

Further, users of towed and recreational vehicles often wish to customise the accessories, and their operation, available for use on their vehicles. The power distribution systems of some of these vehicles, however, are not readily customisable or require a fully custom setup which adds additional cost and complexity to the installation. For example, in an existing typical custom setup for a power distribution system for a caravan or camper trailer, an installer installs each of the desired accessories by wiring them with little or no centralized control. In this installation, the power distribution system includes multiple scattered distribution panels, switches and user input controls, and multiple wiring looms. Alternatively, the installation could be performed by a manufacturer of a towed vehicle and instead is highly standardized. In this case, however, while the costs of installation are lower and the installation standardized, the user is then unable to readily add accessories to be controlled and modified. Further, the power distribution system and wiring in this existing standardized setup is specific to the make and model of the vehicle, making it even more difficult to modify later to incorporate new accessories to the vehicle for the user to control.

SUMMARY OF INVENTION

According to one aspect of the present invention, there is provided a power distribution system for controlling operation of loads of a vehicle or a towed vehicle, the system including: a user interface adapted to be mounted in the vehicle or the towed vehicle and adapted to be configured to implement a user switch to control operation of a designated one of the loads; a controller adapted to mounted in the vehicle or the towing vehicle and adapted to be configured to control operation of the loads via a plurality of channels connected to the loads, respectively, the controller including: a memory adapted to store configuration instructions to control operation of the loads, wherein the configuration instructions are stored in the memory during installation of the power distribution system; and a processor adapted to: receive dynamic inputs relating to the loads during use of the power distribution system from at least in part the user interface, the dynamic inputs including said user switch ON and said user switch OFF; determine a state command to control operation of one or more of the loads based on the configuration instructions stored in the memory and the dynamic inputs; and output the state command to said one or more of the loads via the plurality of channels to control said one or more of the loads.

According to another aspect of the present invention, there is provided a method of controlling operation of loads of a vehicle or a towed vehicle, the method including: configuring a controller adapted to be mounted in the vehicle or the towed vehicle to control operation of the loads via a plurality of channels connected to the loads, respectively; storing configuration instructions in a memory of the controller to control operation of the loads; the controller receiving dynamic inputs relating to the loads at least in part from a user interface adapted to be mounted in the vehicle or the towed vehicle, whereby the user interface is configured to implement a user switch to control operation of a designated one of the loads and the dynamic inputs include said user switch ON and said user switch OFF; a processor of the controller determining a state command to control operation of one or more of the loads based on the configuration instructions stored in the memory and the dynamic inputs; and the processor outputting the state command to said one or more of the loads via the plurality of channels to control said one or more of the loads.

Preferably, the controller is adapted to be mounted in a towed vehicle and adapted to be configured to control operation of loads in the towed vehicle. For example, the towed vehicle is a caravan or camper trailer, and, as mentioned, the loads are electrical loads in the form of vehicle accessories, such as a fridge and a water pump. The controller controls operation of these loads by determining a state command for the loads and outputs the state command for action by the loads. In an embodiment, the state command includes ON and OFF commands to switch loads in the power distribution system ON and OFF, respectively.

With reference to the example, the user interface is a display with graphical representations of the loads and multiple buttons adjacent the representations so that a user can control the caravan or camper trailer loads connected to the controller via the plurality of channels. The user interface is configured so that one of the buttons is configured to implement the user switch. In addition, another one of the buttons is configured to implement a master switch to control operation of selected ones of the loads simultaneously. Preferably, the master switch state overrides the user switch state. Alternatively, the user interface is a touch screen and the user presses graphical representations of the loads to control them. In any event, the dynamic inputs received from the user interface include: load user switch ON; load user switch OFF; master switch ON for the selected loads; and master switch OFF for the selected loads.

In an embodiment, the user interface is further connected to a wireless user interface, such as a smartphone, which is adapted to wirelessly connect to the user interface or to the controller directly using Bluetooth or any other suitable communication means. In the example, the user interface includes graphical representations of the loads in the form of icons indicative of the loads being controlled. In use, the processor receives input from the user to control operation of the loads via the graphical representation of the loads. This input may include controlling a graphical representation of a master switch to switch more than one of the loads ON and OFF or a graphical representation of a specific load switch to switch that specific load ON and OFF.

In an embodiment, during installation of the power distribution system, the controller is mounted and configured to control operation of the loads of the towed vehicle via the plurality of installed channels that are connected to each of the loads. The configuration instructions are stored in the memory during this installation of the power distribution system, and are inputted into the memory using a dedicated tool. In another embodiment, the user interface could be used to input the configuration instructions into the memory.

The channels connect the loads to a power source of the towed vehicle, such as a battery, and typically include at least one fuse per channel. In an embodiment, the controller includes a fuse box containing fuses for the connected loads. Thus, the power distribution system can be installed across multiple makes and models of towed vehicles with different wiring, logic and load requirements to control the connected loads.

In an embodiment, the configuration instructions include one or more of: load master switch control information; load user switch control information; and load override control information. Further, the load master switch control information includes load master switch control enabled and load master switch control not enabled. As mentioned, the controller can control multiple loads simultaneously by action of the master switch. For example, the user can make an input via the master switch on the user interface to turn the lights OFF and all other loads except the fridge OFF in the caravan. The configuration instructions for each of the loads in this example include data on which of the loads in the system have load master switch control enabled and which loads do not.

In an embodiment, the load user switch control information of the configuration instructions includes load user switch control enabled and load user switch control not enabled. For example, the user can make an input via a graphical representation of the user switch of a specific load on the user interface to switch that specific load ON and OFF based on the configuration instructions including data on the load having load user switch control enabled.

In an embodiment, the dynamic inputs further include an input state of a trigger signal from the vehicle or the towing vehicle. In addition, the load override control information includes load override control enabled and load override control not enabled. In the embodiment, the load override control enabled includes load override when the input state of the trigger signal is active. Further, the load override control enabled can further include: load override when drive state high; and load override remembers user state. In the embodiment, for example, a single input from a user, such as turning the ignition ON of a towing vehicle, can thus be used by the system as a trigger signal that is in effect multiplexed to control (i.e. override) multiple selected loads in the system. Other examples of a trigger signal include a towing vehicle reverse light ON, a designated switch being turned ON or OFF, a hysteresis heater being switched ON or OFF, etc.

In an embodiment, the processor receives dynamic inputs from the user interface and the vehicle or towed vehicle, and then determines the state command based on the configuration instructions and the received dynamic inputs. Dynamic inputs include, but are not limited to: load user switch ON; load user switch OFF; input state of trigger signal ON; input state of trigger signal OFF; load master switch ON; and load master switch OFF.

BRIEF DESCRIPTION OF DRAWINGS

Preferred embodiments of the present invention will now be described with reference to the accompanying drawings wherein.

DETAILED DESCRIPTION

Figure 1:
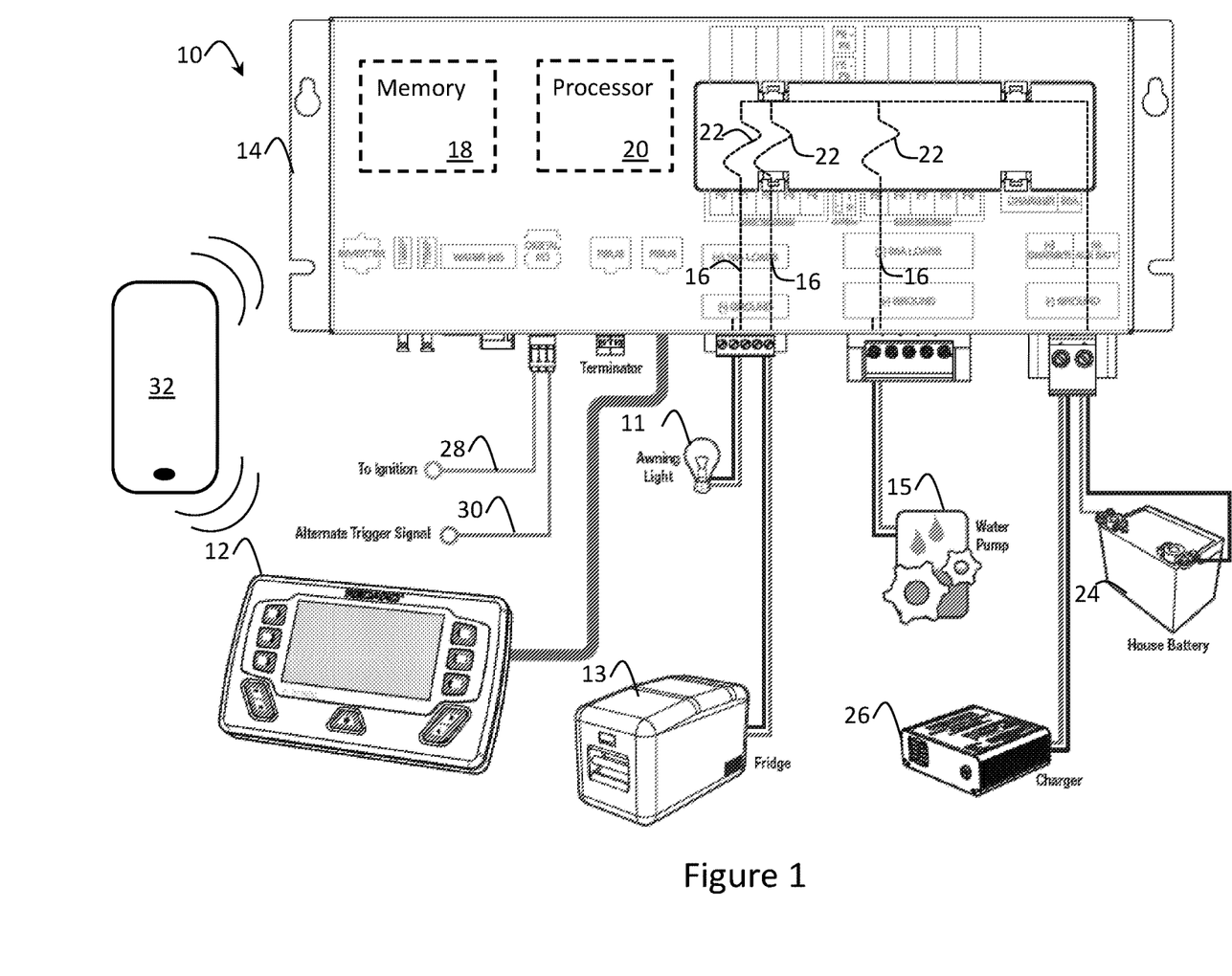
FIG. 1 is a representation of a power distribution system for controlling operation of loads of a vehicle or a towed vehicle according to an embodiment of the present invention.

FIG. 1 shows an embodiment of a power distribution system 10 for controlling operation of loads of a vehicle such as a recreation vehicle or a towed vehicle such as a caravan (not shown). In the embodiment, the power distribution system 10 is for a towed vehicle, such as a caravan, and the loads shown in the Figure include some of the typical caravan accessories of: an awning light 11, fridge 13 and a water pump 15. Other typical loads of a caravan include air compressors, cooking facilities, etc., but these are not shown to simplify the representation.

The system 10 includes a user interface 12 adapted to be mounted in the towed vehicle. In the embodiment, a user interacts with the user interface 12 via user switches to switch loads of the towed vehicle ON and OFF. For example, the user interface 12 displays graphical representations, such as icons, of the loads adjacent buttons on the user interface 12 that are configured to implement user switches to control these loads. In the embodiment, the user interface has six dedicated buttons for controlling six different displayed loads on page 1. If configured, the user can scroll to a second displayed page of different loads and control these loads using the six buttons.

In addition, or in the alternative, the user interacts with a wireless user interface 32, which connects to the user interface 12 via Bluetooth or Wi-Fi. In this embodiment, the wireless user interface 32 is a touch screen (e.g. smartphone) and the user interacts via graphical representations of the loads on the touch screen display to control operation of the loads.

The power distribution system 10 includes a controller 14 adapted to be configured to control operation of the loads via a plurality of channels 16 connected to the loads. In FIG. 1, the controller 14 is mounted in the towed vehicle and the channels 16 are wired between each of the loads and the controller 14. Specifically, the awning light 11, fridge 13, and water pump 15 are shown as being connected via separate channels 16 to the controller 14.

The controller 14 further includes a memory 18 adapted to store configuration instructions to control operation of the loads via the channels 16, and a processor 20 adapted to determine a state command to control operation of the loads based on the configuration instructions stored in the memory 18 and dynamic inputs relating to the loads. These dynamic inputs are received by the processor 20 during use of the power distribution system 10 from the user interface 12 and the towing vehicle. The dynamic inputs include in its simplest form load user switch ON and load user switch OFF. Further dynamic inputs will be discussed below.

The configuration instructions for the power distribution system 10 are first stored in the memory 18 during installation of the system 10, and are generally inputted by an installer of the system 10 using a dedicated tool. As mentioned, in another embodiment, the user can interact with the user interface 12 to input configuration instructions via menu buttons to store configuration instructions at a later time. The configuration instructions include: load master switch control information; load user switch control information; and load override control information.

To control the loads of the towed vehicle, the processor 20 implements software stored on the memory 18 to determine the state commands for one or more loads and output these state commands to the selected loads via the respective channels 16. As mentioned, the state commands include ON and OFF commands to switch the connected loads ON and OFF.

The channels 16 also connect each of the loads to a power source such as a battery 24 or a charger 26, and include at least one fuse 22 to protect the connected load from voltage surges, etc. As mentioned, the controller 14 includes a fuse box containing these fuses 22 for each of the connected loads, and the power distribution system 10 can be installed by an installer on multiple makes and models of towed vehicles. For example, the controller 14 can be installed on a towed vehicle by replacing the existing fuse box on the towed vehicle.

The user interface 12 is also adapted to be configured to implement a master switch to control operation of selected ones of the loads simultaneously. For example, the master switch is configured as a button of the user interface that is configured to switch the awning light 11, fridge 13, and water pump 15 ON and OFF simultaneously. In this example, the configuration instructions include load master switch control enabled and load user switch control enabled for the awning light 11, fridge 13, and water pump 15. The processor 20 receives dynamic inputs in the form of the master switch ON or OFF, and the processor 20 overrides the previous user switch determined state commands for the awning light 11, fridge 13, and water pump 15, to switch them all ON or OFF based on the state of the master switch.

Also connected to the controller 14 to enable control of the loads are further channels to receive dynamic inputs in the form of trigger signals from the towing vehicle ignition 28 and or from any alternate trigger signal 30 such as the towing vehicle braking signal. These further dynamic inputs are received by the processor 20 and are processed by the processor 20 to determine the state command of the loads to implement pre-configured override conditions. In this embodiment, the configuration instructions further include load override control information in the form of load override control enabled and load override control not enabled. These dynamic inputs can then be tailored to suit the desired setup for the control of the loads. For example, if the processor 20 receives a dynamic input in the form of vehicle ignition signal ON, the processor 20 overrides the previous user switch determined state commands for the awning light 11, fridge 13, and water pump 15, to switch the awning light 11 and the water pump 15 OFF, but leave the fridge 13 ON based on the stored load override control information. That is, in this example, the awning light 11 and water pump 15 have load override control enabled and the fridge 13 has load override control not enabled. In another example, the trigger signal includes a dedicated wired switch such as a physical switch somewhere else in the towed vehicle for an additional point of control or a towing vehicle reverse light signal (especially if additional reverse lights are fitted as loads on the towed vehicle).

Not shown in FIG. 1 is also a series of manual controls in the form of DIN switches configured to turn loads connected via each of the channels 16 ON and OFF in the event of the user interface 12 failing. Also, a communication bus can be connected to the controller 14 to send and receive information regarding the loads. For example, the communication bus may communicate status of the loads to be displayed on the user interface 12 or some other display mounted in the towed vehicle. The status of the loads could also be displayed on the wireless user interface 32 if it is connected wirelessly to the user interface 12. In this example, the system 10 replaces the extensive wiring looms that would have previously been required to display the status of the loads on different displays in the towed vehicle and to switch the loads ON and OFF with different dedicated switches in the towed vehicle.

Figure 2:
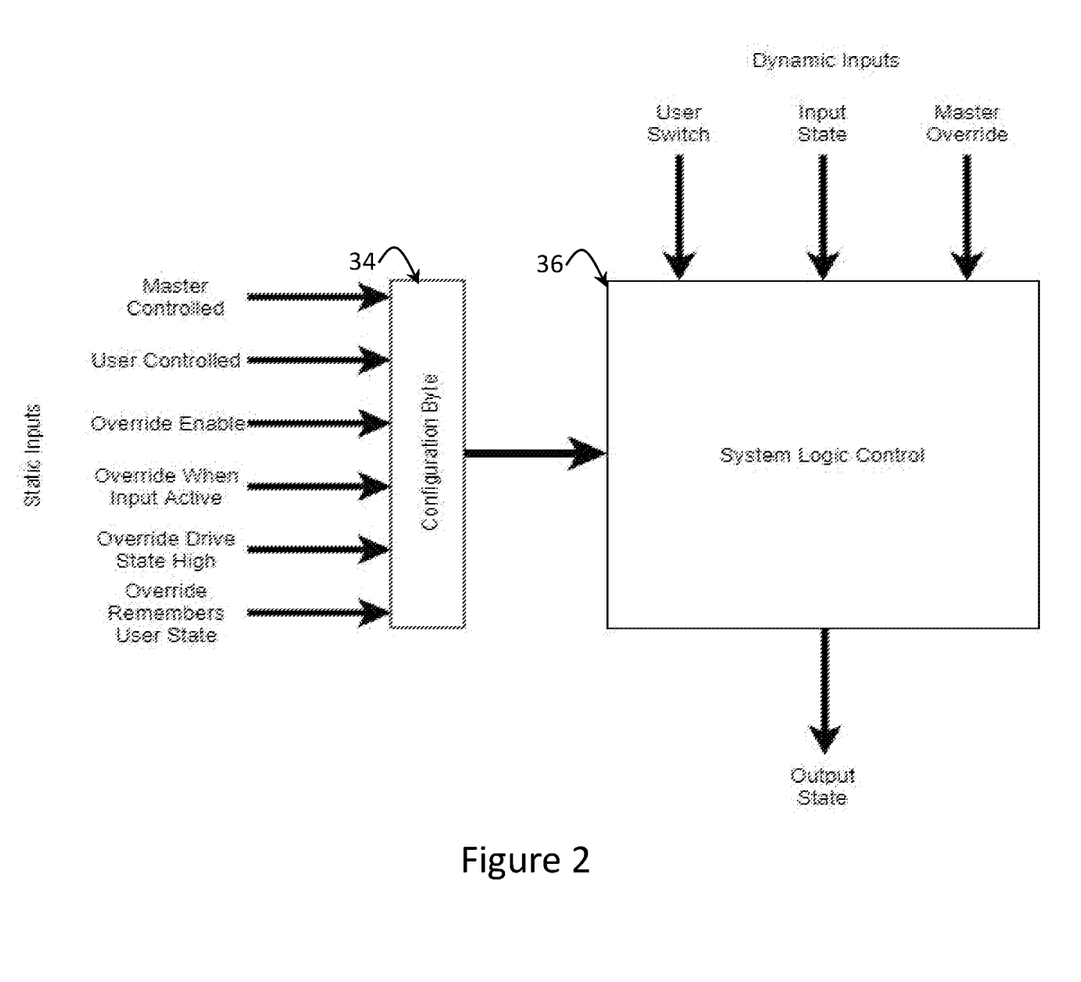
FIG. 2 is a representation of a power distribution system logic for controlling operation of loads according to an embodiment of the present invention.

FIG. 2 shows a graphical representation of operation logic for the power distribution system 10 to be implemented by the processor 20 for controlling operation of the loads. In the embodiment, the configuration information is stored in the memory 18 of the controller 14 in the form of a configuration byte 34. The configuration byte 34 includes for each load: load master switch control information; load user switch control information; and load override control information. The load override control information further includes: load override enabled; load override when input (e.g. trigger signal) active; load override when drive state high; and load override remembers user state.

The processor 20 implements a system logic control module 36 based on the configuration byte 34 stored in the memory 18 and the received dynamic inputs to control operation of each of the loads. Specifically, the processor 20 determines state commands as above to control operation of the loads based on the configuration byte 34 and these dynamic inputs, and outputs the state commands to the loads via the channels 16 to control the loads.

In an example, the awning light 11 of the towed vehicle can be controlled by a user via a user switch on the user interface 12 representing the awning light 11 if awning light user switch control is enabled in the configuration byte 34. Alternatively, or additionally, the awning light 11 can be controlled by a user via a master switch on the user interface 12 if the awning light master switch control is enabled in the configuration byte 34. As mentioned, the master switch on the user interface 12 is a dedicated button that switches ON and OFF all loads that have load master switch control enabled in the configuration byte 34. For example, the awning light 11 and the fridge 13 both have load master switch control enabled so that both the awning light 11 and the fridge 13 are turned OFF but not the water pump 15 when the master switch is in the OFF position. In addition, the designation of load master switch control enabled for certain loads of the power distribution system 10 in the configuration byte 34 can be made both during the initial installation by an installer and later by the user via the user interface 12.

Figure 3:
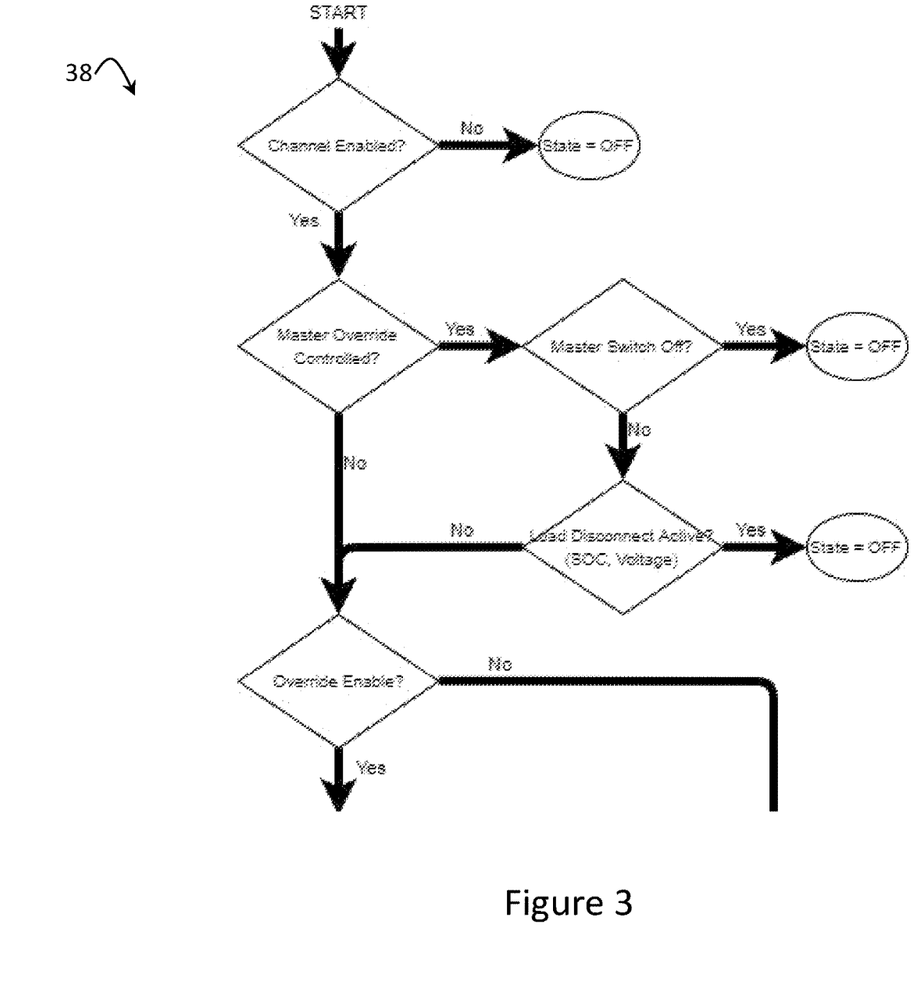
FIG. 3 is a first part of a flow chart of controlling operation of loads according to an embodiment of the present invention.
Figure 4:
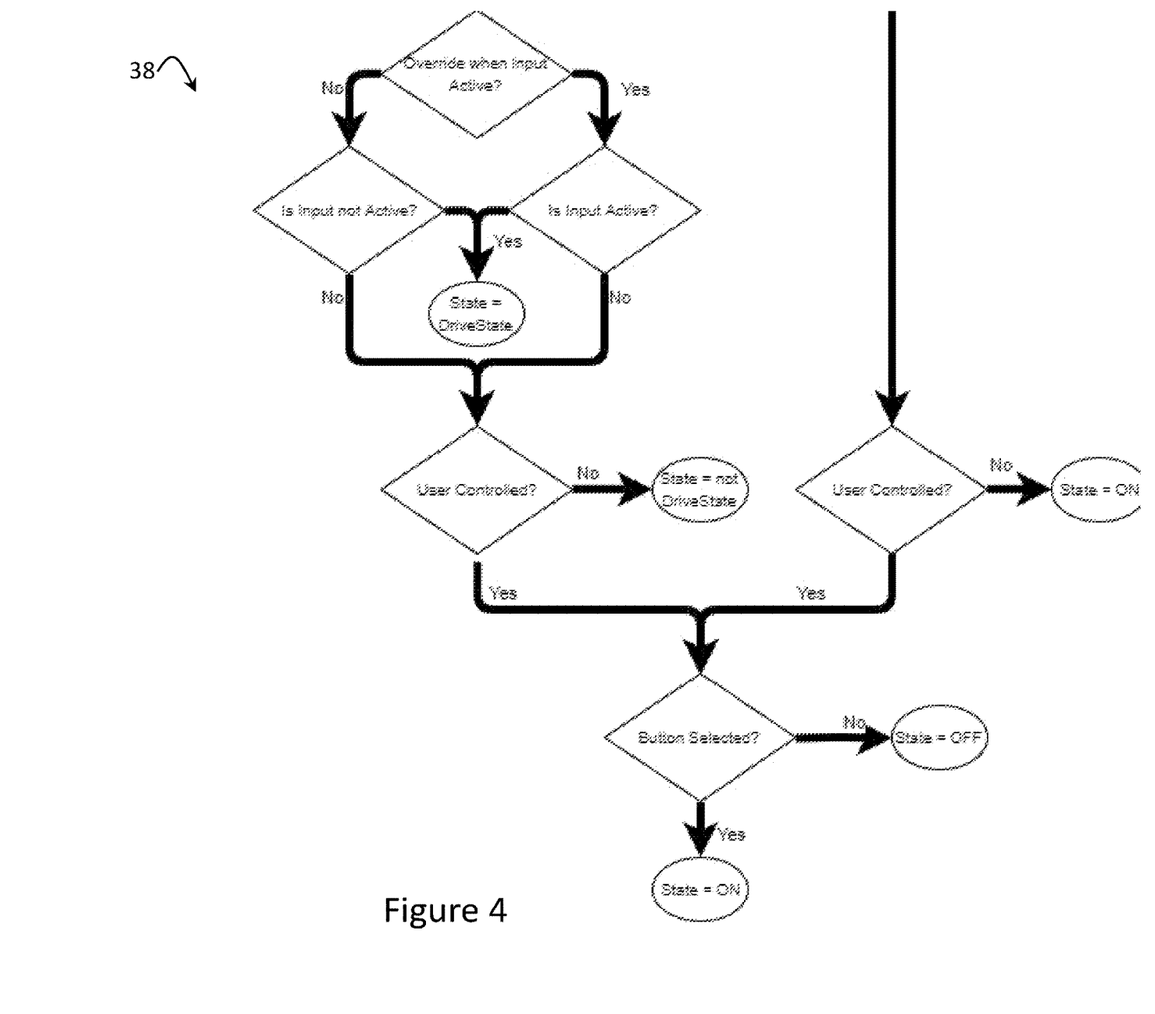
FIG. 4 is a second part of the flow chart of FIG. 3.

FIGS. 3 and 4 show a flow chart 38 of the operation of loads in the power distribution system 10 of a towed vehicle by the system logic control module 36 implemented by the processor 20. In the flow chart, the processor 20 first determines whether a channel is enabled to be controlled and is connected to a load. If so, the processor 20 then determines whether that load has master switch control enabled and, if so, whether the user has switched the master switch ON or OFF. If the user has switched the master switch OFF for that load, the processor 20 determines the state command to be an OFF command and outputs this command to the load for the load to turn OFF. In FIGS. 3 and 4, this load also has a disconnect circuit that may be triggered due to load over-voltage or some other trigger.

The processor 20 then determines from the configuration byte 34 whether the load has override control enabled. If so, the processor 20 determines whether override control is enabled when a dynamic input, such as the towing vehicle ignition, is active. If the override when dynamic input active is not enabled, the processor 20 then determines from the configuration byte 34 whether the load has user switch control enabled and, if so, is the user switch button selected by the user on the user interface 12. If the button is selected as ON, the processor 20 determines the state command to be an ON command and outputs the ON command to the load to turn the load ON.

In an example, the awning light 11 is configured in the configuration byte 34 so that a user of the towed vehicle cannot leave the awning light 11 ON if they drive the towed vehicle. In this example, the ignition input 28 of the towing vehicle would be configured as a dynamic input as active high input #1, (e.g. voltage is greater than 2V). The awning light 11 has its configuration byte 34 configured with master switch override enabled, override enabled and linked to input #1, override when input active, user switch control enabled, and driveState=LOW. When the ignition is OFF, the flow chart 38 falls through to user button controlled on the left branch of the flow chart 38. However, if the ignition is turned ON, the flowchart forces the output state to be equal to driveState LOW. Therefore, when the towing vehicle is started and the ignition is ON, the state command for the awning light 11 is determined to be OFF at all times.

Figure 5:
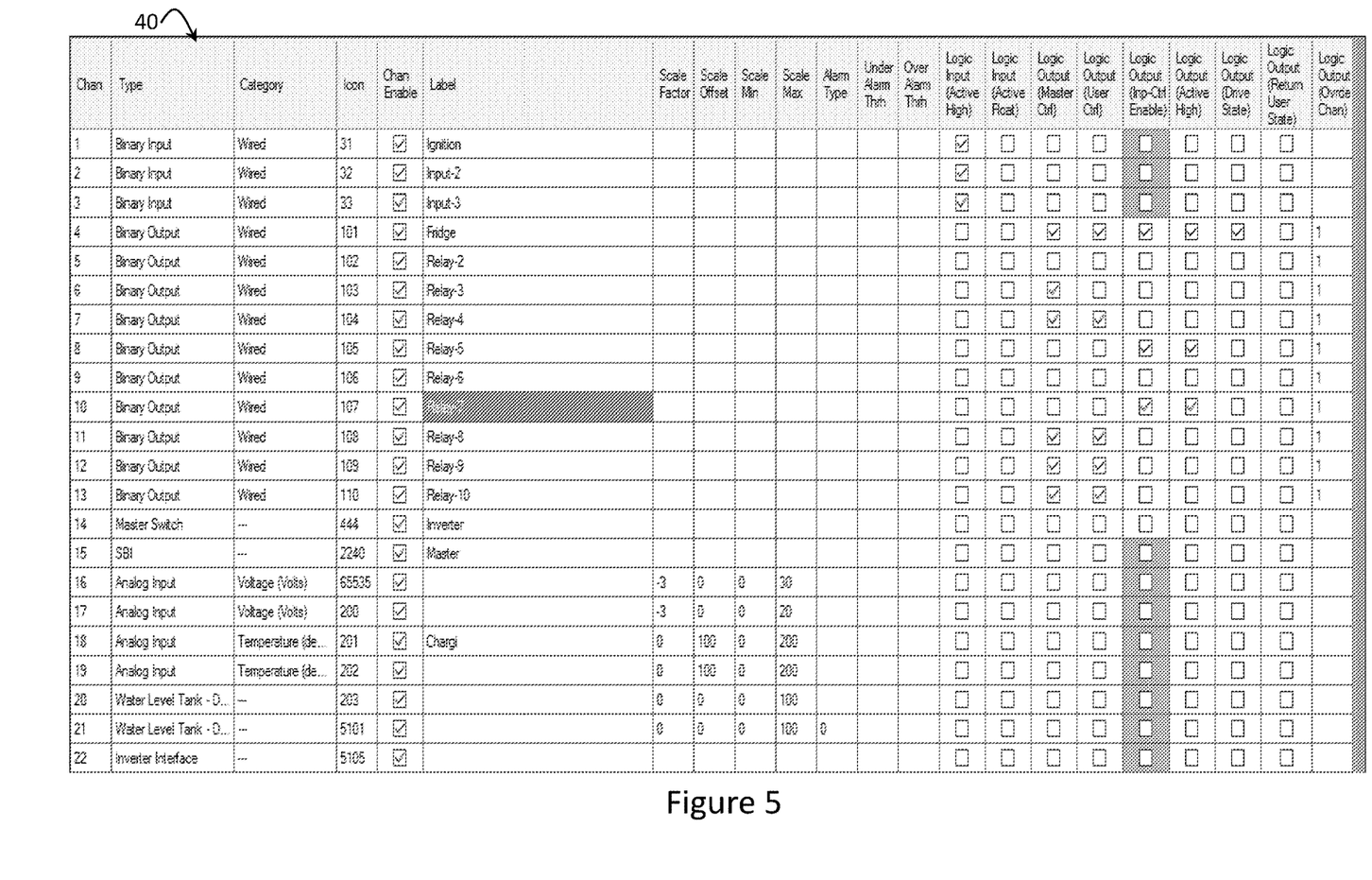
FIG. 5 is a representation of configuration information for controlling operation of loads according to an embodiment of the present invention.

FIG. 5 shows an example of the configuration of the loads of the power distribution system 10 during installation of the system 10. Specifically, FIG. 5 shows a number of channels that are first configured during installation of the power distribution system 10 via a configuration tool 40. In this example, the fridge 13 is connected to channel 4 in the system 10. The installer (or later the user) configures the configuration byte 34 for the fridge 13 so that the load master switch control is enabled, load user switch control is enabled, and load overrides are enabled. In this example, the fridge 13 is set to be overridden when the dynamic input in the form of the towing vehicle ignition on channel 1 is ACTIVE, and when it is overridden it overrides the user state selection to force the output ON. That is, the fridge 13 stays in the ON state when it is no longer overridden unless the user then wants to turn it OFF so that the fridge 13 is configured to be turned ON when the towing vehicle is running regardless of whether it was ON or OFF before. The fridge 13 is also not able to be turned OFF while the towing vehicle is running. Once the towing vehicle ignition is OFF, the ignition on channel 1 is not active and the fridge 13 stays ON until the user turns it OFF with either the user switch or the master switch.

In addition, but not shown in FIG. 5, is a further Logic Output flag entitled Logic Output momentary control which may be enabled during installation for each of the output channels. This flag configures the output of the channels (e.g. channels 4 to 13) to be enabled to be momentary controlled—i.e. channel enabled only while button is held. When a channel is configured as momentary, it will require an ON signal to be sent periodically while the button is held (e.g. every 100 ms) followed by an OFF signal when the button is released. If the repetitive ON command is not received within the timeout period (e.g. 200 ms), it will automatically turn OFF as a safety feature to protect against communications failure. For example, this feature could be used for operating a motor drive on camper trailers or caravans, such as a motor drive for extending or retracting a slide out in a caravan. This allows the user to watch for obstructions while extending the slide out and in the case of an issue releasing the button will stop any further movement.

Figure 6:
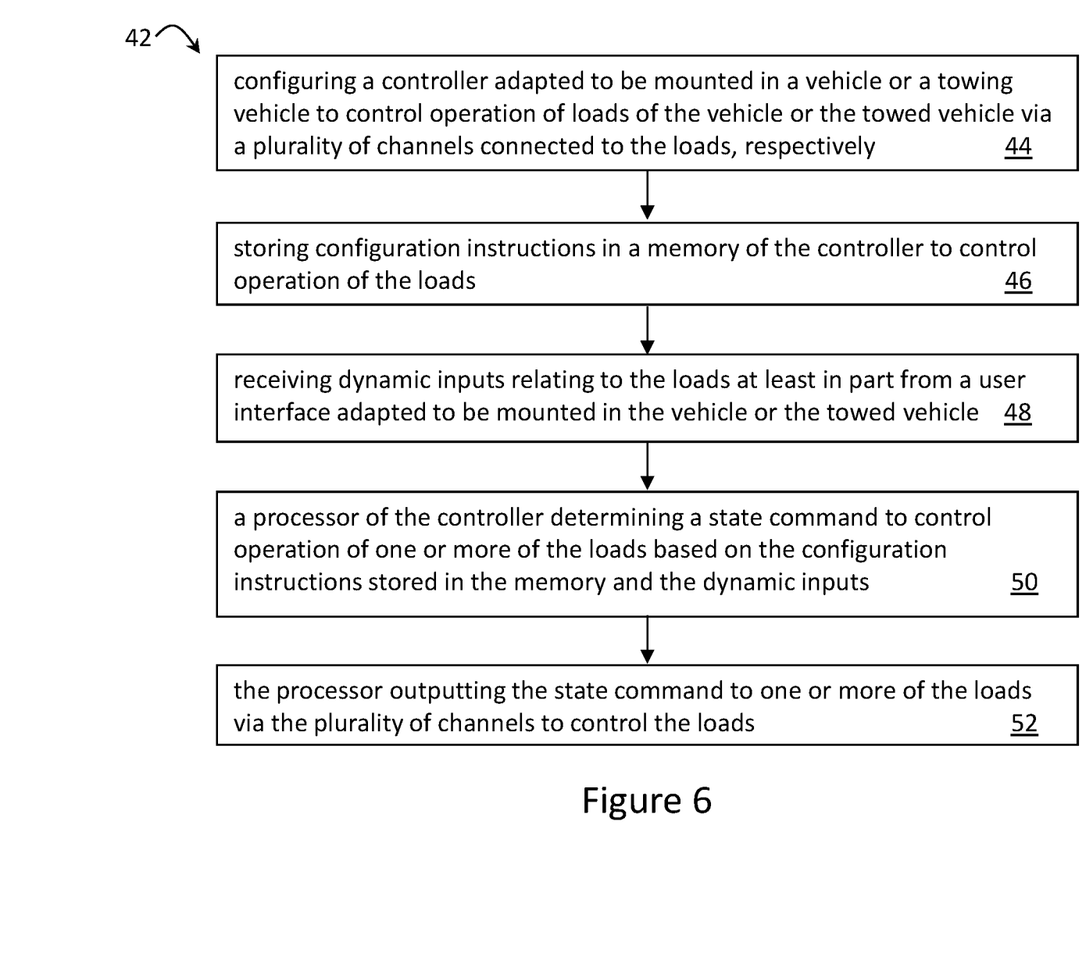
FIG. 6 is a flow chart of a method of controlling operation of loads according to an embodiment of the present invention.

Referring to FIG. 6, a method 42 of controlling operation of loads of a vehicle or a towed vehicle is shown. The method 42 includes the steps of: configuring 44 a controller adapted to be mounted in the vehicle or the towed vehicle to control operation of the loads via a plurality of channels connected to the loads, respectively; storing 46 configuration instructions in a memory of the controller to control operation of the loads; the controller receiving 48 dynamic inputs relating to the loads at least in part from a user interface adapted to be mounted in the vehicle or the towed vehicle, whereby the user interface is configured to implement a user switch to control operation of a designated one of the loads and the dynamic inputs include said user switch ON and said user switch OFF; a processor of the controller determining 50 a state command to control operation of one or more of the loads based on the configuration instructions stored in the memory and the dynamic inputs; and the processor outputting 52 the state command to said one or more of the loads via the plurality of channels to control said one or more of the loads.

In addition, it will be appreciated by those persons skilled in the art that further aspects of the method will be apparent from the above description of the system 10. Further, the person skilled in the art will also appreciate that at least part of the method could be embodied in program code that is implemented by the processor 20 of the system 10. The program code could be supplied in a number of ways, for example on the memory 18.

A reference herein to a patent document or other matter which is given as prior art is not to be taken as an admission that that document or matter was known or that the information it contains was part of the common general knowledge as at the priority date of any of the disclosure or claims herein. Such discussion of prior art in this specification is included to explain the context of the present invention in terms of the inventor's knowledge and experience.

Finally, it is to be understood that various alterations, modifications and/or additions may be introduced into the constructions and arrangements of parts previously described without departing from the ambit of the invention.

The claims defining the invention are as follows:

1. A power distribution system for controlling operation of loads of a vehicle or a towed vehicle, the system including:
   a user interface adapted to be mounted in the vehicle or the towed vehicle and adapted to be configured to implement a user switch to control operation of a designated one of the loads;
   a controller adapted to mounted in the vehicle or the towing vehicle and adapted to be configured to control operation of the loads via a plurality of channels connected to the loads, respectively, the controller including:
      a memory adapted to store configuration instructions to control operation of the loads, wherein the configuration instructions are stored in the memory during installation of the power distribution system; and
      a processor adapted to:
         receive dynamic inputs relating to the loads during use of the power distribution system from at least in part the user interface, the dynamic inputs including said user switch ON and said user switch OFF;
         determine a state command to control operation of one or more of the loads based on the configuration instructions stored in the memory and the dynamic inputs; and
         output the state command to said one or more of the loads via the plurality of channels to control said one or more of the loads.

2. A power distribution system as claimed in claim 1, wherein the user interface is further adapted to be configured to implement a master switch to control operation of selected ones of the loads simultaneously, and wherein the dynamic inputs further include said master switch ON and said master switch OFF.

3. A power distribution system as claimed in claim 2, wherein the dynamic inputs further include an input state of a trigger signal from the vehicle or the towing vehicle.

4. A power distribution system as claimed in claim 3, wherein the configuration instructions include one or more of: load master switch control information;
   load user switch control information; and load override control information.

5. A power distribution system as claimed in claim 4, wherein the load master switch control information includes load master switch control enabled and load master switch control not enabled.

6. A power distribution system as claimed in claim 4, wherein the load user switch control information includes load user switch control enabled and load user switch control not enabled.

7. A power distribution system as claimed in claim 4, wherein the load override control information includes load override control enabled and load override control not enabled.

8. A power distribution system as claimed in claim 7, wherein the load override control enabled includes load override when the input state of said trigger signal is active.

9. A power distribution system as claimed in claim 8, wherein the load override control enabled further includes: load override when drive state high; load override remembers user state.

10. A power distribution system as claimed in claim 1, wherein the state command includes ON and OFF to switch said one or more of the loads ON and OFF, respectively.

11. A power distribution system as claimed in claim 1, wherein the user interface includes graphical representations of the loads.

12. A power distribution system as claimed in claim 11, wherein the processor receives input from the user to control operation of said one or more of the loads via the graphical representation of said one or more of the loads and or a button adjacent said one or more of the loads.

13. A power distribution system as claimed in claim 1, wherein the power distribution system is for controlling operation of loads of said towed vehicle and the controller is adapted to be mounted in the towed vehicle.

14. A power distribution system as claimed in claim 1, wherein the user interface is further configured to connect to a wireless user interface to control operation of the loads.

15. A method of controlling operation of loads of a vehicle or a towed vehicle, the method including:
   configuring a controller adapted to be mounted in the vehicle or the towed vehicle to control operation of the loads via a plurality of channels connected to the loads, respectively;
   storing configuration instructions in a memory of the controller to control operation of the loads;
   the controller receiving dynamic inputs relating to the loads at least in part from a user interface adapted to be mounted in the vehicle or the towed vehicle, whereby the user interface is configured to implement a user switch to control operation of a designated one of the loads and the dynamic inputs include said user switch ON and said user switch OFF;
   a processor of the controller determining a state command to control operation of one or more of the loads based on the configuration instructions stored in the memory and the dynamic inputs; and
   the processor outputting the state command to said one or more of the loads via the plurality of channels to control said one or more of the loads.

* * * * *